3,527,771
DEHYDROHALOGENATION OF
4-HALOTETRAHYDROPYRANS
Paul R. Stapp, Bartlesville, Okla., assignor to Phillips
Petroleum Company, a corporation of Delaware
No Drawing. Filed Oct. 27, 1967, Ser. No. 678,519
Int. Cl. C07d 7/10
U.S. Cl. 260—345.1                                    7 Claims

ABSTRACT OF THE DISCLOSURE

Dihydro-2[H]-pyrans are formed by thermal dehydrohalogenation of certain 4-halotetrahydropyrans at temperatures within the range of 400 to 600° C.

---

This invention relates to thermal dehydrohalogenation of 4-halotetrahydropyrans. In another aspect, this invention relates to the formation of dihydro-2[H]-pyrans by thermal dehydrohalogenation of 4-halotetrahydropyrans.

Dihydropyrans are known to be useful compounds, particularly as starting materials for the manufacture of valuable chemicals. For example, British Pat., 558,106, discloses that dihydropyrans can be converted in the presence of Friedel-Crafts catalysts to both liquid and crystalline polymers. Such polymers are useful as lubricants and molding materials. Likewise, U.S. Pat. 2,448,260 discloses that polyvinyl hydroxide and dihydropyran can be converted into polyvinyl tetrahydropyryl esters which are good adhesives for glass, wood, and metal. Furthermore, U.S. Pat. 2,479,812 discloses that dihydropyrans can be hydrolyzed with water to yield 1,5-pentanediol. This compound is useful in the manufacture of polyester and urethane resins, hydraulic fluid, lube oil additives, and antifreeze.

One source of dihydropyrans is 4-halotetrahydropyrans. It ils known that 4-halotetrahydropyran can be converted to dihydropyran by contacting the 4-halotetrahydropyran with potassium hydroxide in refluxing 1,2-ethanediol. This method was heretofore commercially undesirable because of the high cost of producing the 4-halotetrahydropyran and the expense of the caustic de-dehydrohalogenation reaction mixture.

Recently, a relatively inexpensive and commercially feasible process has been developed for producing 4-halotetrahydropyrans. Therefore, there is needed relatively inexpensive and commercially feasible process for converting the 4-halotetrahydropyrans to dihydropyrans.

One object of this invention is to provide a novel process for producing dihydropyrans.

Another object of this invention is to provide a process for producing dihydro-2[H]-pyrans by thermal dehydrohalogenation of 4-halotetrahydropyrans.

According to the invention, I have discovered that certain 4-halotetrahydropyrans can be converted in the presence of heat to dihydro-2[H]-pyrans. The dehydrohalogenation occurs thermally at a temperature within the range of 400 to 600° C.

The 4-halotetrahydropyrans which can be converted according to this invention are prepresented by the general formula:

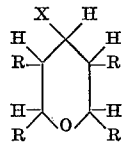

wherein X is a halogen, e.g. fluorine, chlorine, bromine, or iodine, and R is chosen from hydrogen or hydrocarbyl radicals such as alkyl, cycloalkyl, aryl, or combinations thereof such as alkaryl and aralkyl, containing in the range of 1 to 8 carbons atoms per radical, and where the total number of carbon atoms in the compound does not exceed seventeen. The 4-halotetrahydropyrans which contain in the range of 5 to 10 carbon atoms per molecule are generally preferred. Particularly preferred are the 4-chlorotetrahydropyrans containing in the range of 5 to 10 carbon atoms per molecule.

Examples of suitable 4-halotetrahydropyran compounds include 4-chlorotetrahydropyran, 4-bromotetrahydropyran, 4-iodotetrahydropyran, 4-fluorotetrahydropyran, 3-methyl-4-chlorotetrahydropyran, 2-propyl-4-chlorotetrahydropyran, 2,3,6-tributyl-4-chlorotetrahydropyran, 3-benzyl-4-chlorotetrahydropyran, 3-(2-methylcyclopentyl)-4-chlorotetrahydropyran, 2,6-dihexyl-4-fluorotetrahydropyran, and the like, and mixtures thereof.

The 4-halotetrahydropyrans of this invention can be synthesized by any method known in the art. One method of synthesizing 4-halotetrahydropyrans is disclosed in Chemical Abstracts, 51, 1156–7 (1957). A recently disclosed and highly economical method of producing 4-halotetrahydropyrans comprises the reaction of paraformaldehyde and hydrogen halides with certain olefins.

Conventional equipment for effecting thermal reactions can be employed in this invention. For example, heated columns made from and packed with materials substantially non-reactive with the chemical species of this invention under the conditions of this invention are normally preferred as a means of effecting the process of this invention. Particularly, the use of quartz-lined reactors and quartz-lined reactors packed with quartz chips have been suitable. Temperatures in the range of 400 to 600° C. can be employed in the process of this invention, but normally, temperatures in the range of 475 to 525° C. are preferred. The reaction can be carried out either in the liquid or vapor phase and at either superatmospheric or subatmospheric pressures; however, atmospheric pressure is normally preferred because of convenience. Reaction times sufficient to effect the desired degree of conversion can be employed. Normally, reaction times in the range of about five minutes to about twenty-four hours are preferred.

Preferably, a feedstream of only a 4-halotetrahydropyran or mixtures of 4-halotetrahydropyrans are passed to a heated reaction zone. However, it is within the scope of this invention to employ suitable diluents in the feed in combination with the 4-halotetrahydropyran. Suitable diluents are those that do not deleteriously affect the conversion of this invention. For example, diluents such as benzene, toluene, hexane, octane, cyclohexane, and the like can be employed if desired.

In a particularly preferred embodiment of this invention, the 4-halotetrahydropyran feed is passed by downflow through a heated quartz-lined reactor packed with quartz chips and maintained under a blanket of an inert gas such as nitrogen or the like. The vapors from the quartz reactor are then collected and condensed.

The following examples are given to better facilitate the understanding of this invention and are not intended to limit the scope of this invention.

EXAMPLE 1

Over a period of 2.3 hours, 50 parts by weight of 4-chlorotetrahydropyran was passed by downflow through a cylindrical quartz reactor packed with quartz chips and maintained at 500° C. The reactants were maintained under a blanket of nitrogen. During the reaction period, the product vapors were collected and condensed. The product was separated by a fractional distillation. The material boiling at 89.5° C. was identified by nuclear magnetic resonance analysis to be 3,6-dihydro-2-[H]-pyran.

EXAMPLE 2

A second run was made which corresponded exactly to the first example except 105 parts by weight of 3-methyl-4-chlorotetrahydropyran was passed to the reactor over a period of 5.8 hours. The product fraction boiling between 95 and 108° C. was identified by infrared analysis to be 5,6-dihydro-3-methyl-2[H]-pyran.

The two examples demonstrate the thermal dehydrohalogenation process of this invention. Particularly, Example 1 demonstrates that 4-halotetrahydropyrans containing 5 carbon atoms can be thermally dehydrohalogenated to 3,6 - dihydro-2-[H]-pyrans, and Example 2 demonstrates that 3-alkyl-4-halotetrahydropyrans can be thermally dehydrohalogenated to yield dihydro-3-alkyl-2[H]-pyrans. Accordingly, the other 4-halotetrahydropyrans, as disclosed above, will react in a similar manner to yield dihydro-2-[H]-pyran products.

I claim:

1. A process comprising heating a 4-halotetrahydropyran compound having the formula:

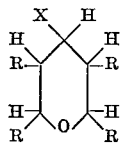

wherein X is halogen and each R is hydrogen, alkyl of 1 to 8 carbon atoms, cycloalkyl of up to 8 carbon atoms, or phenyl and wherein the total number of carbon atoms in the compound does not exceed seventeen; to a temperature in the range of 400 to 600° C. to thereby form a dihydro-2-[H]-pyran.

2. The process of claim 1 wherein said heating occurs for a period of about five minutes to about twenty-four hours.

3. The process of claim 1 wherein said temperature is a temperature in the range of 475 to 525° C.

4. The process of claim 1 wherein said heating occurs in a quartz-lined reaction zone.

5. The process of claim 4 wherein said quartz-lined reaction zone contains quartz particles.

6. The process of claim 1 wherein said 4-halotetrahydropyran comprises 4 - chlorotetrahydropyran and said dihydro-2[H]-pyran comprises 3,6 - dihydro-2[H]-pyran.

7. The process of claim 1 wherein said 4-halotetrahydropyran comprises 3 - methyl-4-chlorotetrahydropyran, and said dihydro - 2[H]-pyran comprises 5,6-dihydro-3-methyl-2-[H]-pyran.

References Cited

Theilheimer, "Synthetic Methods of Organic Chemistry," vol. 13, Inter-Science Pub., Inc., New York, (1959) p. 344, entry 711.

Jones et al., Quarterly Reviews, vol. 4, pp. 195, 210 and 211 (1950).

HENRY R. JILES, Primary Examiner

J. M. FORD, Assistant Examiner